Jan. 24, 1967   J. W. WALLACE   3,299,572
DRIVE-THROUGH LIVESTOCK GATE
Filed Dec. 7, 1964
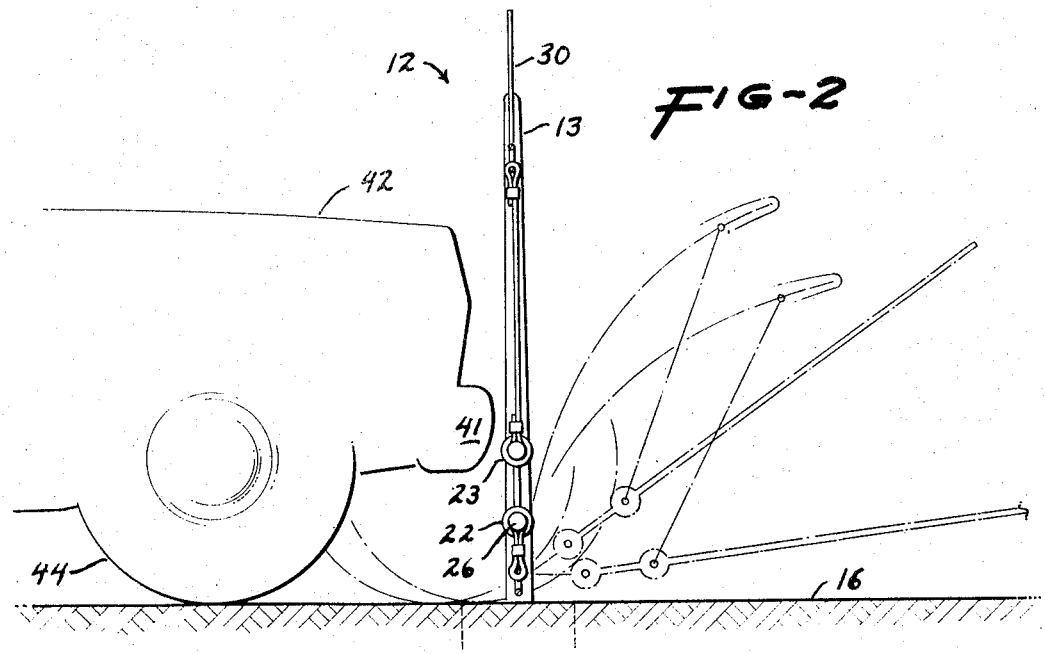
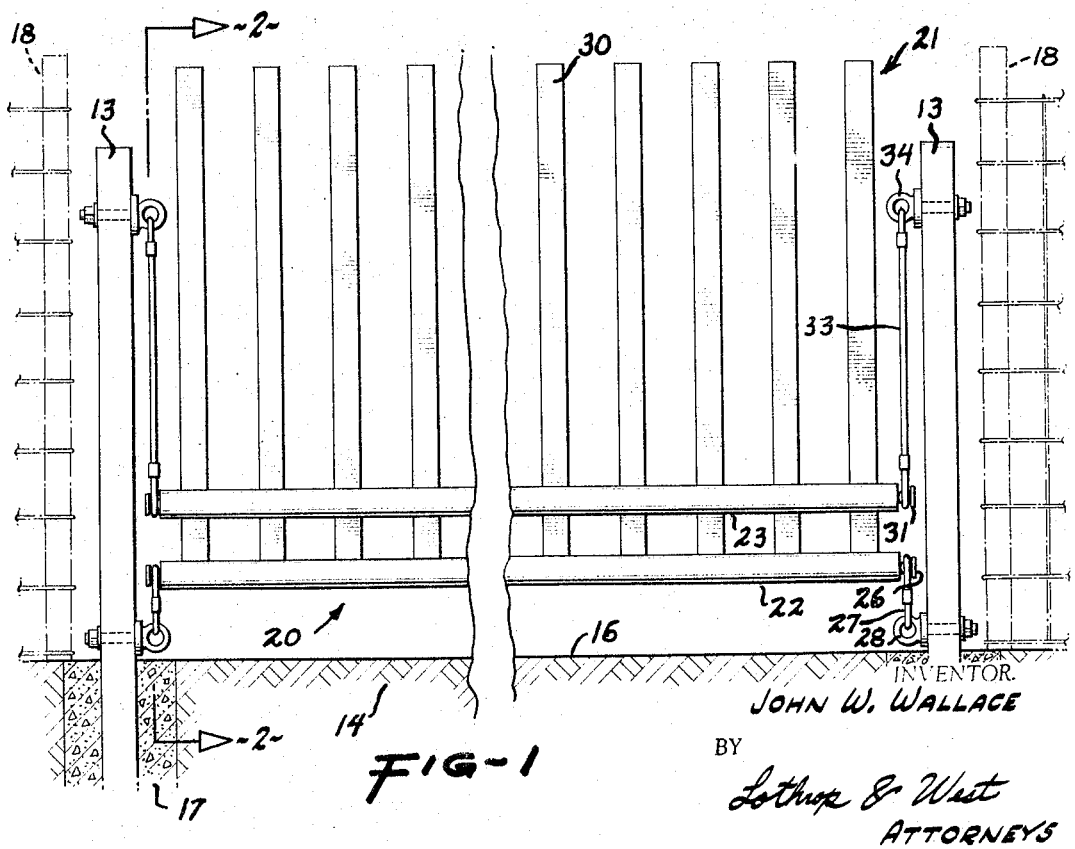
INVENTOR.
JOHN W. WALLACE
BY
Lothrop & West
ATTORNEYS

# United States Patent Office 3,299,572
Patented Jan. 24, 1967

3,299,572
DRIVE-THROUGH LIVESTOCK GATE
John W. Wallace, 3426 Marysville Blvd.,
Sacramento, Calif. 95838
Filed Dec. 7, 1964, Ser. No. 416,274
5 Claims. (Cl. 49—131)

The invention relates to gates normally effective to bar the passage of livestock but which readily enable a motor vehicle to pass therethrough.

The prior art is replete with various kinds of automatic or vehicle-operated gates. In the main, however, these gates have been relatively complicated and expensive. Furthermore, such gates often necessitate the use of attendant mechanism located in the ground, thus leading to the clogging of such mechanism by leaves, wind-blown trash, dirt and mud, and frequently, in the winter, ice and snow.

It is therefore an object of the invention to provide a drivethrough livestock gate which, while being relatively uncomplicated and inexpensive, is highly reliable and effective in operation.

It is another object of the invention to provide a gate which affords its own resiliency and which therefore has a minimum of parts to get out of order.

It is yet another object of the invention to provide a gate which requires for its installation in the ground only a pair of post holes.

It is a further object of the invention to provide a gate which readily yields to a motor vehicle, but which efficiently serves to bar the movement of livestock through the gate.

It is still a further object of the invention to provide a generally improved drive-through livestock gate.

Other objects, together with the foregoing, are attained in the embodiment described in the following description and shown in the accompanying drawing in which:

FIG. 1 is a fragmentary front elevational view of a gate shown in a typical environment, portions being shown in section; and, FIG. 2 is a sectional view, the plane of the section being indicated by the line 2—2 in FIG. 1, the figure further showing the front end of a vehicle driving through the gate, with certain elements of the gate being shown in outline in various progressive positions corresponding to movement of the vehicle through the gate.

While the gate of the invention is susceptible of numerous physical embodiments, depending upon the environment and requirements of use, gates comparable to the embodiment depicted have been made, tested and used and have performed in an entirely satisfactory manner.

The drive-through livestock gate of the invention, generally designated by the reference numeral 12, includes a spaced pair of vertical, resilient posts 13 sunk into the ground 14 on each side of a roadway 16 and appropriately encased in concrete 17. The gate spans the roadway opening between adjacent fences 18.

Preferably, the resilient gateposts 13 are constructed from a flexible, tough, durable material, free from attack by the elements, such as fiber glass. In side elevation, the posts 13 are tapered so as to provide a proportionately greater yield at the top than at the bottom (see FIG. 2).

Extending between and substantially spanning the distance between the gateposts 13 is the gate itself, the gate being generally characterized by the reference numeral 21.

The gate 21 comprises, adjacent its lower end, a cross-bar structure 20 including a lower cross rod 22, or bar, and an upper cross rod 23.

Projecting from each end of the lower bar 22 is a pin 26 having pivotally mounted thereon a lower tie member 27 pivotally mounted at its lower end on a lower anchor 28, such as an eye-bolt, mounted adjacent the bottom end of the gatepost 13.

Mounted on the cross-bar structure and normally extending vertically upwardly is a plurality of flexible battens 30, or strips, of material such as fiber glass. The strips are so spaced and so dimensioned that livestock, particularly large animals such as horses and cattle are deterred from trying to pass through or overrun the batten barrier.

For some installations, as appears in FIGS. 1 and 2, the upper cross rod 23 is utilized in conjunction with the lower cross rod 22 although in other smaller gates, only one cross rod is used. The upper cross rod not only provides additional strength and rigidity to the gate but its elevated location affords an increased moment arm or gate righting arm, as will now be explained.

Each end of the upper cross rod 23 is provided with a pin 31 pivotally mounted on a tie member 33 which in turn is pivotally mounted on an upper anchor member 34, such as an eye bolt, mounted adjacent the top of the gate post 13.

The natural resiliency of the gateposts 13 urges the posts into normally upright posture, and the distance between the axis of the upper cross rod 23 and the lower eye bolt 28 provides a moment arm with the eyebolt serving as a fulcrum.

Thus, as appears most clearly in FIG. 2, when the bumper 41 of an advancing vehicle 42 comes into contact with the upper cross rod 23 and urges it toward the right, the cross rods and the associated battens yield and overturn in an angular, clockwise direction about the lower eye bolt anchor 28 as a fulcrum. The overturning effort is resisted by the yielding resiliency of the flexible gateposts acting through the upper tie member 33 on the moment arm measured, as stated above, by the distance between the pin 31 and the eye bolt 28.

As the vehicle continues to advance, its front wheels 44 come into engagement with the cross rods and the gate is thereby further overturned until it lies substantially in face to face engagement with the roadway 16.

It will be realized that while in the embodiment shown, the cross rods are circular in section, the rods can also be made fairly flat in cross section so that somewhat less resistance would be encountered by the vehicle's tires as they run over the cross rods.

Once the vehicle's front wheels pass over the upper cross rod, the front wheels advance so as to overlie the battens themselves, thus holding the gate down. At about the time the front wheels move off the battens, the vehicle's rear wheels move onto the gate, thus continuing to keep the gate in fully overturned position.

After the rear of the vehicle advances beyond the gate, the flexed, resilient gateposts, acting through the moment arm, return the cross-bar structure and the battens into the normally upright attitude concurrently with the return of the gateposts themselves to their normally vertical posture. While FIG. 2 shows the gate opened in one direction, it will be realized that it works equally well in the other direction.

As can be seen, there are a minimum number of elements which move and, consequently, there is very little to get out of order. The tie members 33 and 27 can be fabricated either of rods or cables, and the battens 30 of fiberglass. In some instances, the battens 30, particularly those over which the vehicle's tires can be expected to run, are sheathed with an extra thickness of fiberglass material as a further measure of protection against wear. Being somewhat flexible, the battens 30 do not cause damage to the vehicle's chrome or other coating. The battens are sufficiently rigid and closely spaced, and the righting moments are sufficiently strong, however, to discourage the probing efforts even of large animals.

What is claimed is:
1. A drive-through livestock gate comprising:
 (a) a pair of resilient gateposts;
 (b) an upper anchor on each gatepost;
 (c) a lower anchor on each gatepost;
 (d) a cross-bar structure extending substantially across the distance between said gateposts adjacent the bottoms thereof, said cross-bar structure including adjacent each end a pair of vertically spaced pivot pins located above said lower anchor;
 (e) tie means for connecting each end of said cross-bar structure including said pivot pins to the adjacent of said upper and said lower anchors; and,
 (f) a plurality of battens upstanding from said cross-bar structure.

2. The device of claim 1 wherein said battens are flexible, and said gateposts are of fiberglass material.

3. The device of claim 1 wherein said tie means includes an upper tie member connecting the upper one of said pivot pins and the adjacent one of said upper anchors, and a lower tie member connecting the lower one of said pivot pins and the adjacent one of said lower anchors.

4. The device of claim 3 wherein said cross-bar structure comprises a lower transverse rod and an upper transverse rod spaced vertically therefrom, and wherein each end of said rods have said pivot pins mounted thereon.

5. The device of claim 1 wherein said gateposts are tapered.

References Cited by the Examiner
UNITED STATES PATENTS

| | | | |
|---|---|---|---|
| 1,253,453 | 1/1918 | Zorn | 39—6 |
| 1,481,666 | 1/1924 | Francis | 39—5 |
| 2,561,683 | 7/1951 | Benke | 39—6 |
| 2,592,736 | 4/1952 | Puckett | 39—24 |

HARRISON R. MOSELEY, *Primary Examiner.*

D. L. TAYLOR, *Assistant Examiner.*